(12) United States Patent
Dev et al.

(10) Patent No.: US 10,523,375 B2
(45) Date of Patent: Dec. 31, 2019

(54) SCHEDULING ACKNOWLEDGEMENTS TO RECEIVED SUB-FRAMES IN A MULTI-SIM USER EQUIPMENT USING A SHARED TRANSMIT CHAIN WHEN RECEIVING DATA CONTINUOUSLY ON EACH SIM

(71) Applicant: Intel Corporation, Santa Clara, CA (US)

(72) Inventors: Rishav Dev, Bangalore (IN); Mohit Vajpeyee, Bangalore (IN); Avinash K Dubey, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/688,912

(22) Filed: Aug. 29, 2017

(65) Prior Publication Data
US 2018/0097585 A1 Apr. 5, 2018

(30) Foreign Application Priority Data
Sep. 30, 2016 (IN) .............................. 201641033553

(51) Int. Cl.
| | | |
|---|---|---|
| H04W 72/00 | (2009.01) | |
| H04L 1/18 | (2006.01) | |
| H04W 72/12 | (2009.01) | |
| H04W 72/02 | (2009.01) | |
| H04W 72/14 | (2009.01) | |

(52) U.S. Cl.
CPC .......... H04L 1/1822 (2013.01); H04L 1/1854 (2013.01); H04W 72/02 (2013.01); H04W 72/1268 (2013.01); *H04W 72/14* (2013.01)

(58) Field of Classification Search
CPC ............... H04L 1/1822; H04L 1/1854; H04W 72/1268; H04W 72/14
See application file for complete search history.

(56) References Cited

U.S. PATENT DOCUMENTS

2015/0099528 A1* 4/2015 Hu ....................... H04W 72/042
455/452.1
2017/0280400 A1* 9/2017 Xiao ................... H04W 76/048

\* cited by examiner

*Primary Examiner* — Pakee Fang
(74) *Attorney, Agent, or Firm* — Viering, Jentschura & Partner MBB

(57) ABSTRACT

A multi-SIM wireless device checks whether each of the (e.g., two) SIMs has received sub-frames in successive intervals prior to a current interval. If such a condition is satisfied by all the SIMs, the wireless device allocates several successive (transmit) intervals to a first SIM before allocating next successive (transmit) intervals to another SIM. If such a condition is not satisfied, the sub-intervals may be allocated according to any other approach (i.e., not constrained by the requirement of successive sets of transmit intervals to the two SIMs) as suited for the specific situation. The allocated sub-frame intervals are used to send the acknowledgements of the previously received sub-frames.

17 Claims, 7 Drawing Sheets

| maxHARQTx/TWS(in ms) | 8 | 15 | 23 | 31 | 39 | 63 | 71 | 79 | 87 |
|---|---|---|---|---|---|---|---|---|---|
| 2 | 12.5 | 53.33 | 34.78 | 51.61 | 41.03 | 50.79 | 45.07 | 50.63 | 45.97 |
| 3 | 0 | 0 | 34.78 | 25.81 | 20.51 | 25.39 | 33.8 | 30.38 | 27.59 |
| 4 | 0 | 0 | 0 | 25.81 | 20.51 | 25.39 | 22.53 | 20.25 | 18.39 |
| 5 | 0 | 0 | 0 | 0 | 20.51 | 12.69 | 11.27 | 20.25 | 18.39 |
| 6 | 0 | 0 | 0 | 0 | 0 | 12.69 | 11.27 | 10.13 | 9.2 |
| 7 | 0 | 0 | 0 | 0 | 0 | 12.69 | 11.27 | 10.13 | 9.2 |
| 8 | 0 | 0 | 0 | 0 | 0 | 12.69 | 11.27 | 10.13 | 9.2 |
| 10 | 0 | 0 | 0 | 0 | 0 | 0 | 0 | 10.13 | 9.2 |

FIG. 7

SCHEDULING ACKNOWLEDGEMENTS TO RECEIVED SUB-FRAMES IN A MULTI-SIM USER EQUIPMENT USING A SHARED TRANSMIT CHAIN WHEN RECEIVING DATA CONTINUOUSLY ON EACH SIM

CROSS-REFERENCE TO RELATED APPLICATIONS

This application claims priority to Indian Patent Application Serial No. 201641033553, which was filed Sep. 30, 2016, and is incorporated herein by reference in its entirety.

BACKGROUND

Technical Field

Aspects of the present disclosure relate generally to user equipment used in wireless telephone networks, and more specifically to scheduling acknowledgements to received sub-frames in multi-SIM user equipment using a shared transmit chain when receiving data continuously on each SIM (Subscriber Identity Module).

Related Art

Wireless user equipment (UE), or wireless devices in general, refer to instruments such as mobile phones using which users connect with mobile telephone networks on a wireless medium, as is well known in the relevant arts. In a common scenario, a UE interfaces with a base station of a mobile telephone network providing the corresponding user the facility of voice and data based services.

UEs are often provided with multiple SIMs and associated receive circuitry such that each SIM can receive data concurrently with any other SIM. Each of such SIMs may also receive data continuously, for example, when corresponding video data is received for each SIM. Aspects of the present disclosure are related to such scenarios in which UEs are required to acknowledge the received data.

BRIEF DESCRIPTION OF THE VIEWS OF DRAWINGS

Example aspects of the present disclosure will be described with reference to the accompanying drawings briefly described below.

FIG. 7 is a diagram of a table containing throughput loss values for various combinations of transmit window size and retransmission limits maintained in a UE, in an aspect of the present disclosure.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

Figure 1:
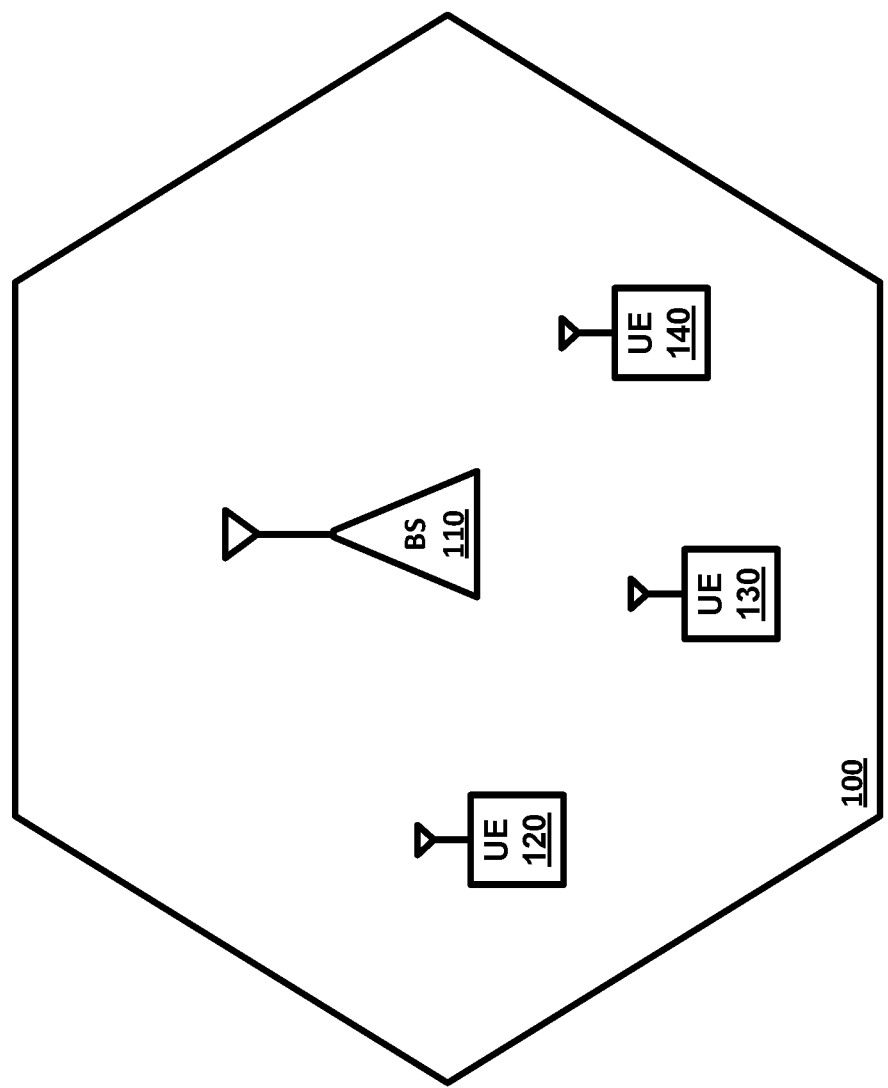
FIG. 1 is a block diagram of an example environment in which several aspects of the present disclosure can be implemented.

UEs are often provided with subscriber identity modules (SIMs). A SIM typically contains various information such as telephone number, the international mobile subscriber identity (IMSI) number (also the phone number) used by a service provider to identify and authenticate a subscriber, security keys, temporary information related to the local network, a list of the services provided by the service provider, etc.

A single UE may be provided with multiple SIMs, for example, to facilitate the UE to communicate with two different telephone networks (service providers). In such UEs, multiple SIMs may be designed to share a same transmit chain (including a portion thereof, within the transceiver) for reasons such as cost and power-savings. As is also well known in the relevant arts, a transmit chain is used for modulating a carrier with information bits and translating the modulated carrier to a desired frequency band for transmission on a wireless medium at a desired power level.

Frames are employed for synchronization and coordination of transmission in wireless telephone networks at a physical layer level as is also well known in the relevant arts. Frames may contain sub-frames, with each sub-frame being used for transmitting a sequence of symbols which are error-coded (e.g., with CRC for each sub-frame). For example, in the LTE FDD standard, a frame may span 10 milli-seconds split as 10 sub-frames, each of one milli-second duration.

A UE may receive data (in the form of sub-frames) continuously on each of the respective multiple SIMs. The term 'continuously' implies successive sub-frames are received in consecutive sub-frame intervals carrying data portions spanning one or more frames allocated for reception by the same SIM. For example, when a UE receives video data, the corresponding data units may be received continuously.

UEs are often required to generate acknowledgements with respect to individual sub-frames to enable flow-control and retransmissions when required. A positive acknowledgement ACK is sent to indicate that a corresponding sub-frame was accurately received, while a negative acknowledgement NACK is used to indicate error in reception of the corresponding sub-frame.

Standards may specify the maximum duration by which an ACK is to be successfully received by the sender (here base station) after which a sender may retransmit the data corresponding to the unacknowledged sub-frame. It may be desirable to reduce such retransmissions for reasons such as higher effective data throughput.

Aspects of the present disclosure are accordingly applicable when multiple SIMs of a user equipment are able to concurrently receive sub-frames while only one of the SIMs can transmit data on a wireless medium in any sub-frame interval. In an aspect of the present disclosure, a UE checks whether each of the (e.g., two) SIMs has received sub-frames in successive intervals prior to a current interval. If such a condition is satisfied by all the SIMs, the UE allocates several successive (transmit) intervals to the first SIM before allocating next successive (transmit) intervals to another SIM.

If such a condition is not satisfied, the sub-frame intervals may be allocated according to any other approach (i.e., not constrained by the requirement of successive sets of transmit intervals to the two SIMs) as suited for the specific situation. The allocated sub-frame intervals are used to send the acknowledgements of the previously received sub-frames. By having allocated successive sets of transmit intervals to each SIM, the number of acknowledgements which are not transmitted timely (causing the sender to retransmit the corresponding frames) are reduced.

According to an aspect of the present disclosure, each of the SIMs is allocated an equal number of successive sub-frame intervals, which is a multiple of 8 or one less thereto.

Several aspects of the disclosure are described below with reference to examples for illustration. It should be understood that numerous specific details, relationships, and methods are set forth to provide a full understanding of the disclosure. One skilled in the relevant arts, however, will readily recognize that the disclosed features can be practiced without one or more of the specific details, or with other methods, etc. In other instances, well-known structures or operations are not shown in detail to avoid obscuring the features of the disclosure.

2. Example Environment

FIG. 1 is a block diagram representing an example environment in which several aspects of the present disclosure can be implemented. The example environment is shown containing only representative devices and systems for illustration. However, real world environments may contain more or fewer systems/devices. FIG. 1 is shown containing a cell 100 of a cellular network. Cell 100 is shown containing base station 110 and user equipment (UE) 120, UE 130 and UE 140. Cell 100 and the devices therein may operate according to any of well-known standards/specifications for wireless mobile communications such as, for example, GSM (Global System for Mobile communication), LTE (Long Term Evolution, including both Frequency Division Duplex and Time Division Duplex), etc.

Base station 110 is a fixed communications unit and provides the last-mile (or last hop) communications link to UEs in the cell. Although not shown in FIG. 1, base station 110 may be connected to other devices/systems in the cellular network infrastructure to enable UEs in cell 100 to communicate with devices (e.g., other UEs) in other cells, with landline communications equipment in a conventional PSTN (Public Switched Telephone Network), public data networks such as the internet etc. In the context of LTE, base station 110 is referred to as eNodeB. Although noted as a base station, base station 110 can also correspond to a macrocell, microcell or a femtocell. Macro/micro/femtocells are special cellular base stations (operating over small cell areas) that are often deployed in small areas to add extra cell capacity. For example, such small cells can be deployed temporarily during sporting events and other occasions where a large number of cell phone users are expected to be concentrated in one spot.

While only one base station is shown in FIG. 1 for simplicity, the environment of FIG. 1 can have multiple base stations with overlapping coverage as well. In such situations, a UE may be able to connect with (and exchange data/voice) with each of the multiple base stations if the UE is equipped to operate with a corresponding number of SIMs.

UE 120, UE 130 and UE 140 represent wireless devices such as mobile phones, and may be used for wireless communication such as voice calls, data exchange such as web browsing, receiving and sending emails, etc. A UE (e.g., UE 120) may be equipped with multiple (e.g., two) SIMs, thereby enabling the UE to simultaneously and continuously receive data for each of the multiple SIMs (all from a same base station or from respective bases stations). The multiple SIMs may permit access to either the same type of radio access technique (e.g., both SIMs are for LTE networks), or for dissimilar radio access techniques (e.g., one SIM for LTE and the other SIM for 2G, one SIM for LTE and the other SIM for 3G, one SIM for LTE and the other SIM for 5G, etc.

The UE may need to transmit acknowledgements to the respective (or same) base stations upon receipt of data units received by each of the SIMs, in the manner specified by the communication standard (e.g., LTE) to which the UE (and the environment of FIG. 1) conform.

However, as noted above, for reasons such as cost, power consumption etc., a UE may be implemented to have only a limited number (e.g., only one transmit chain shared by two SIMs) of transmit chains. Accordingly, the UE may need to schedule the acknowledgements for transmission to the respective base station using a shared transmit chain. The manner in which such scheduling is achieved is described next with respect to a flowchart.

3. Multiplexing a Transmit Chain

Figure 2:
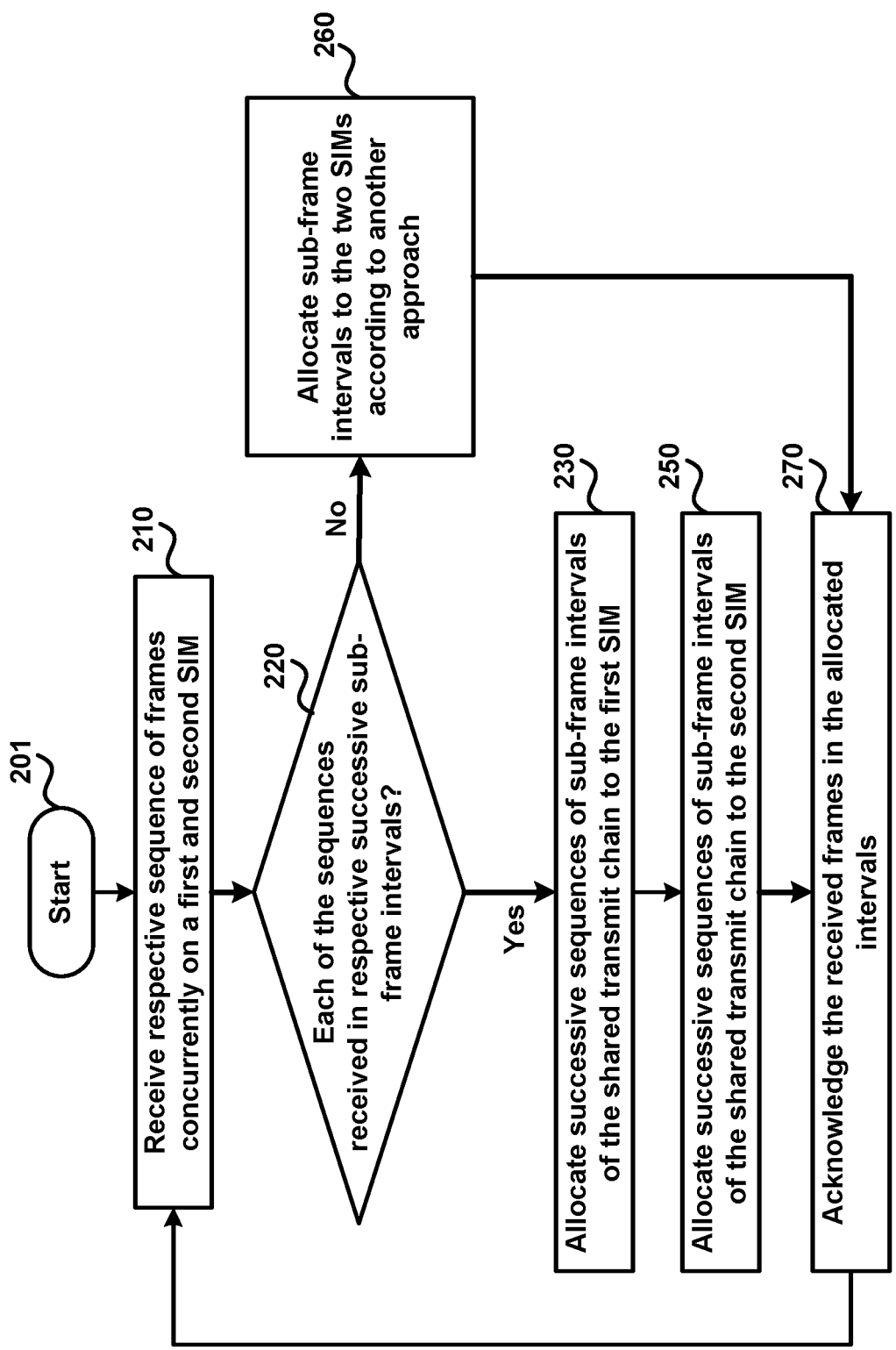
FIG. 2 is a flow-chart illustrating the manner in which acknowledgements to received sub-frames in a multi-SIM user equipment are transmitted using a shared transmit chain when receiving data continuously on each SIM, according to an aspect of the present disclosure.

FIG. 2 is a flowchart illustrating the manner in which acknowledgements to received sub-frames in a multi-SIM user equipment are scheduled using a shared transmit chain when receiving data continuously on each SIM (Subscriber Identity Module). The flowchart is described with respect to the environment of FIG. 1, and in relation to UE 120, merely for illustration. However, various features described herein can be implemented in other environments and using other components as well, as will be apparent to one skilled in the relevant arts by reading the disclosure provided herein. Further, the steps in the flowchart are described in a specific sequence merely for illustration. The flowchart starts in step 201, in which control passes immediately to step 210.

In step 210, UE 120 receives concurrently a first sequence of frames on a first SIM and a second sequence of frames on a second SIM. The frames are received concurrently (or simultaneously) in view of the presence of two independent receivers (in UE 120), which can receive packets on the corresponding two SIMs independently. Control then passes to step 220.

In step 220, UE 120 determines whether frames in each of the sequences are received in respective successive sub-frame intervals (i.e., continuously). In other words, determination is made as to whether the first sequence of frames are received in successive sub-frame intervals, and whether the second sequence of frames also satisfies the same condition. Control transfers to step 230 if both sequences satisfy the condition, and to step 260 otherwise.

In step 230, UE 120 allocates successive sequences of sub-frame intervals to the first SIM for transmitting acknowledgements and/or data, and in step 250 UE 120 allocates following successive sequences of sub-frame intervals to the second SIM for transmitting acknowledgements and/or data. Control then transfers to step 270.

In step 260, UE 120 allocates sub-frame intervals to the two SIMs according to another approach in which the sub-frame intervals need not be successive. In other words, such approach can be suited for the corresponding situations. For example, a goal may be to acknowledge the packets soon (contrasted with the delays that would occur with some of the acknowledgement when steps 230 and 250 operate) so that buffering is reduced at the sender and subsequent packets are forwarded quickly.

In step 270, UE 120 acknowledges the received frames in the allocated intervals. As will be clear from the description below, steps 230 and 250 operate to reduce the loss of acknowledgements (when the condition of step 220 is met) at least in environments such as LTE (and when at least one sub-interval is used to switch transmit allocation from one SIM to the other), while step 260 leaves open alternative approaches to transmit allocation as suited for the specific situation. In one such alternative approach noted below, when the sub-frames are received in sparse intervals, the allocation of the shared transmit chain is switched more frequently to attempt to send the acknowledgement in the very first transmit opportunity. Control then passes to step 210, and the corresponding steps of the flowchart may then be executed.

The features thus described can be implemented in various implementations to address corresponding situations. The description is continued with respect to the details of an example implementation of UE 120.

4. User Equipment

Figure 3:
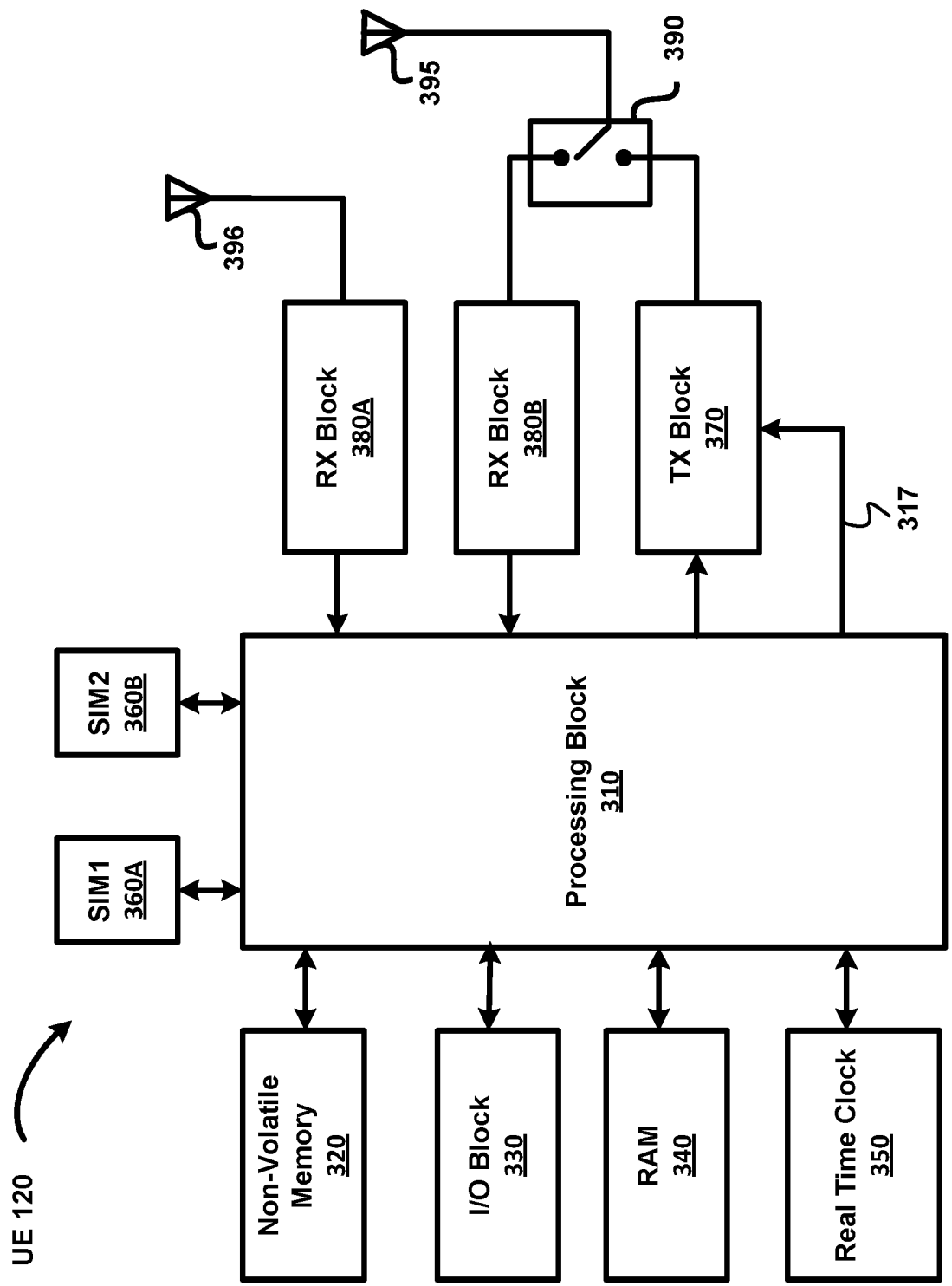
FIG. 3 is a block diagram illustrating the details of a user equipment (UE) in an aspect of the present disclosure.

FIG. 3 is a block diagram depicting the implementation details of a UE in an aspect of the present disclosure. UE 120 is shown containing processing block 310, non-volatile memory 320, input/output (I/O) block 330, random access memory (RAM) 340, real-time clock (RTC) 350, SIM1 360A, SIM2 360B, transmit (TX) block 370, receive (RX) blocks 380A and 380B, switch 390, and antennas 395A and 395B. Some or all units of UE 120 may be powered by a battery (not shown).

In another aspect of the present disclosure, UE 120 is mains-powered and contains corresponding components such as regulators, power filters, etc. The specific blocks of UE 120 are shown by way of illustration only, and UE 120 may contain more or fewer blocks depending on specific requirements. According to yet another aspect, UE 120 corresponds to a dual-SIM mobile phone that is implemented to operate according to LTE specifications in Frequency Division Duplex (FDD) mode as well as Time Division Duplex (TDD) mode.

In the description below, however, it is assumed that UE 120 is operated in LTE FDD mode. However, in other aspects, UE 120 may correspond in general to multi-SIM mobile phone capable of operating according to other radio access technologies (such as, for example, GSM, 3G, 5G, etc.) as well.

Each of SIM1 360A and SIM2 360B represents a subscriber identity module (SIM) that may be provided by a service provider. As is well known in the relevant arts, a SIM may store the international mobile subscriber identity (IMSI) number (also the phone number) used by a service provider to identify and authenticate a subscriber. Additionally, a SIM may store address book/telephone numbers of subscribers, security keys, temporary information related to the local network, a list of the services provided by the service provider, etc. Though not shown, the UE is equipped with two holders, each for housing a respective one of the two SIMs 360A and 360B. Typically, the SIM is 'inserted' into such housing before the UE can access the services provided by the network operator for subscriber configured on the SIM.

Processing block 310 may read the IMSI number, security keys etc., in transmitting and receiving voice/data via TX block 370 and RX blocks 380A/380B respectively. SIM1 and SIM2 each enable UE 120 to subscribe to respective LTE services (data, voice, etc.) according to both FDD and/or TDD.

RTC 350 operates as a clock, and provides the 'current' time to processing block 310. Additionally, RTC 340 may internally contain one or more timers. I/O block 330 provides interfaces for user interaction with UE 120, and includes input devices and output devices. The input devices may include a keypad and a pointing device (e.g., touchpad). Output devices may include a display with touch-sensitive screen.

Antenna 396 operates to receive from a wireless medium, corresponding wireless signals (representing voice, data, etc.) according to one or more standards such as LTE, and provides the received wireless signals to RX block 380A. Antenna 396 may also be connected via a switch to a transmit block (such as TX block 370 described below), but such blocks and connections are not shown in FIG. 3 in the interest of conciseness.

Antenna 395 operates to receive from, and transmit to, a wireless medium, corresponding wireless signals (representing voice, data, etc.) according to one or more standards such as LTE. Switch 390 may be controlled by processing block 310 (connection not shown) to connect antenna 395 to one of blocks 370 and 380B as desired, depending on whether transmission or reception of wireless signals is required. Switch 390, antenna 395 and the corresponding connections of FIG. 3 are shown merely by way of illustration. Instead of a single antenna 395, separate antennas, one for transmission and another for reception of wireless signals, can also be used. Further, although separate antennas 395 and 396 are shown in FIG. 3, a single antenna can instead be used using appropriate techniques, as would be apparent to one skilled in the relevant arts.

Each of RX blocks 380A and 380B represents a receiver (or receive chain) that receives a corresponding wireless (RF) signal bearing voice/data and/or control information via the corresponding antennas and switches, demodulates the RF signal, and provides the extracted voice/data or control information to processing block 310. RX blocks 380A and 380B each may contain RF circuitry (front-end filter, low-noise amplifier, mixer/down-converter, filters) as well as baseband processing circuitry for demodulating the down-converted signal. Alternatively, RX blocks 380A and 380B may contain only the RF circuitry, with processing block 310 performing the baseband operations in conjunction with the RF circuitry. Data/voice for SIM1 and SIM2 are received via RX blocks 380A and 380B respectively.

According to aspects of the present disclosure, UE 120 may concurrently receive data continuously (as against intermittently) for SIM1 via RX block 380A and data for SIM2 via RX block 380B. UE 120 transmits acknowledgements to the receive data for each SIM by time-multiplexing shared transmitter TX block 370 (or transmit chain as noted below) according to the flowchart of FIG. 2, as described in detail below.

TX block 370 (which represents a shared transmit chain) receives, from processing block 310, digital signals representing information (voice, data, acknowledgements to received data, etc.) to be transmitted on a wireless medium (e.g., according to the corresponding standards/specifications), generates a modulated radio frequency (RF) signal (according to the standard), and transmits the RF signal via switch 390 and antenna 395. TX block 370 may contain RF circuitry (mixers/up-converters, local oscillators, filters, power amplifier, etc.) as well as baseband circuitry for modulating a carrier with the baseband information signal.

Alternatively, TX block 370 may contain only the RF circuitry, with processing block 310 performing the modulation and other baseband operations (in conjunction with the RF circuitry). TX block 370 (or the transmit chain in general) may additionally include shared memory resources and software modules used in the transmit operations. In particular, and as described in detail below, TX block 370 is multiplexed by UE 120 to transmit acknowledgments to sub-frames received for SIM1 360A and SIM2 360B via RX block 380A and RX block 380B respectively.

Sharing of TX block 370 (the share transmit chain) may be achieved by processing block 310 tuning (via control signal in path 317) TX block 370 to the corresponding frequency band (or channel) that is desired for transmitting the respective acknowledgements (or data). Typically, such tuning involves changing the frequency of the local oscillators and filter pass bands in the transmit chain such that the transmitted signal (at antenna 395) lies in the desired frequency band.

Thus, in the context of LTE FDD, for transmitting acknowledgements to sub-frames received by SIM1 (via RX block 380A), processing block 310 tunes the transmit chain to cause the transmitted wireless signal to lie in one (desired) frequency band, and for transmitting acknowledgements to sub-frames received by SIM2 (via RX block 380B), processing block 310 tunes the transmit chain to cause the transmitted wireless signal to lie in another (desired) frequency band. In the context of LTE TDD, such tuning as noted above may not be required, and processing block 310 may merely assign the transmit chain (without tuning) to the corresponding transmit operations for the respective SIM.

Non-volatile memory 320 is a non-transitory machine readable medium, and stores instructions, which when executed by processing block 310, causes UE 120 to operate as described herein. In particular, the instructions enable UE 120 to operate as described with respect to the flowchart of FIG. 2. The instructions may either be executed directly from non-volatile memory 320 or be copied to RAM 340 for execution.

RAM 340 is a volatile random access memory, and may be used for storing instructions and data. RAM 340 and non-volatile memory 320 (which may be implemented in the form of read-only memory/ROM/Flash) constitute computer program products or machine (or computer) readable medium, which are means for providing instructions to processing block 310. Processing block 310 may retrieve the instructions, and execute the instructions to provide several features of the present disclosure.

Processing block 310 (or processor in general) may contain multiple processing units internally, with each processing unit potentially being designed for a specific task. Accordingly, processing block 310 may be implemented as separate processing cores, one each to handle operations for each SIM. Alternatively, processing block 310 may contain only a single general-purpose processing unit, and operations for each SIM may be handled by respective execution threads (software instructions) executed using processing block 310. Among other operations, processing block 310 enables acknowledgements to sub-frames received by SIM1 and SIM2 by operating the transmit chain in a time multiplexed fashion according to the flowchart of FIG. 2, and as illustrated below.

Further, processing block 310 applies error correction or detection techniques to determine if each sub-frame received by SIM1 and SIM2 has any error or not, and accordingly schedules either a (positive) ACK (in case of no error) or a NACK (in case of error) for transmission to the corresponding base station(s). In general, processing block 310 executes instructions stored in non-volatile memory 350 or RAM 340 to enable UE 120 to operate according to several aspects of the present disclosure, described in detail herein.

Figure 4:
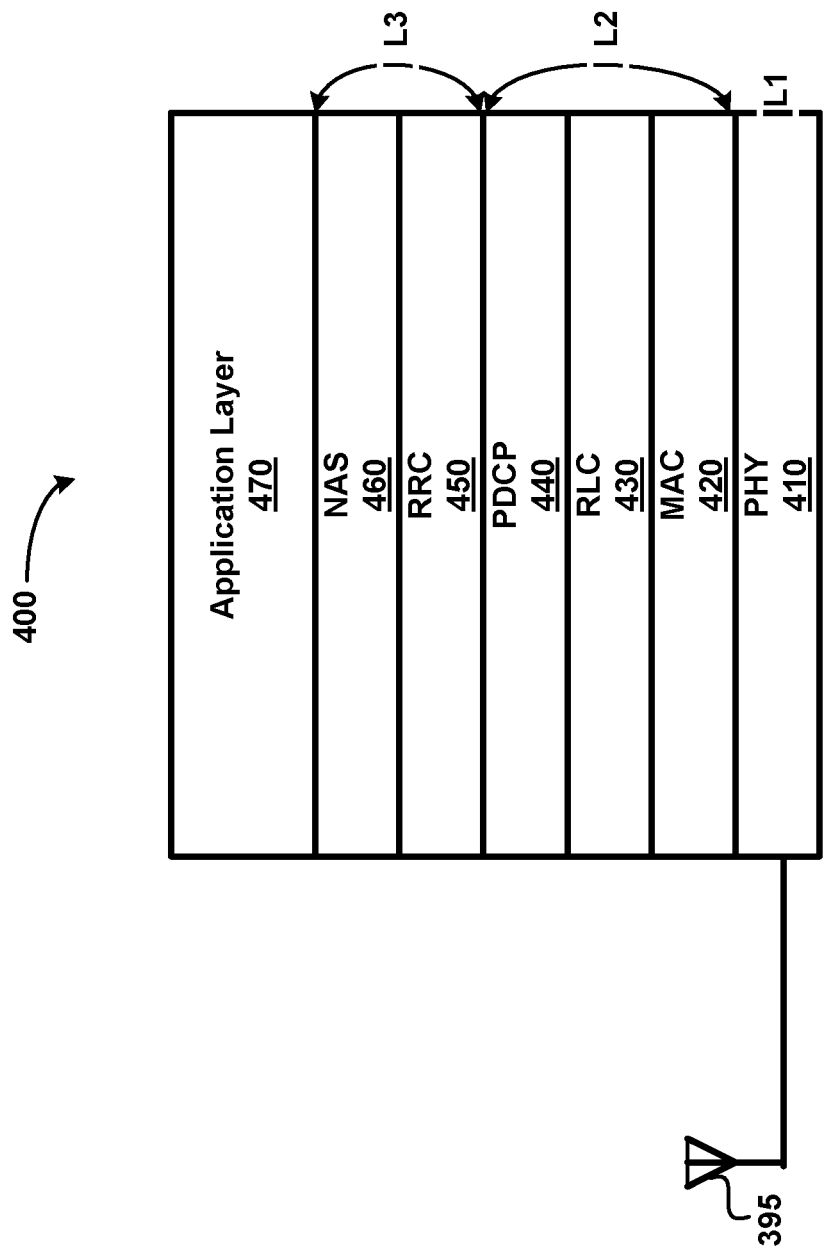
FIG. 4 is a block diagram depicting a protocol stack implemented in a UE in an aspect of the present disclosure.

FIG. 4 illustrates an alternative view of the implementation of UE 120, and shows an example protocol stack implemented in UE 120 for handling operations for one SIM. Protocol stack 400, which is assumed to handle operations for SIM2 360B is shown containing layers L1, L2, L3 and the application layer. The various layers in stack 400 may be implemented to generally conform to the ISO OSI (International Standards Organization Open Systems Interconnect) model, and are only briefly described below, since the corresponding implementations of the blocks would be well known to one skilled in the relevant arts on reading the disclosure herein.

Further, only the relevant blocks of the protocol stack are shown in FIG. 4, and typically more blocks (such as transport layer etc.) according to the ISO OSI model may be present, as also would be apparent to one skilled in the relevant arts. Although not shown in FIG. 4 in the interest of conciseness, UE 120 may have another protocol stack, similar to stack 400, for handling the operations corresponding to SIM1 360A. Alternatively, protocol stack 400 may be designed to handle operations for both SIMs. It is assumed herein that UE 120 is implemented to have separate stacks for each of the two SIMs.

In stack 400, Layer 1 corresponds to PHY 410, which represents the electrical and physical interface between UE 120 and a transmission medium (here a wireless medium). PHY 410 receives data from MAC 420 and forwards the data to antenna 395 for transmission. PHY 410 receives data from antenna 395 and forwards the data to MAC 420 for further processing. PHY 410 includes TX block 370 and RX block 380B. Although TX block 370 is shown as part of the protocol stack for SIM2 in the interest of simplifying the description, TX block 370 is controlled by a software component (executed by processing block 310) to transmit acknowledgements/data either for SIM1 or SIM2.

Layer 2 includes MAC (Medium Access Control layer) 420, Radio Link Control layer (RLC) 430 and Packet Data Convergence Protocol (PDCP) 440. MAC 420 performs operations such as mapping between logical channels and transport channels, error correction through HARQ, priority handling between logical channels, etc. In particular, MAC 420 is designed to transmit HARQ acknowledgements (ACK/NACK noted above) to sub-frames received by SIM2. The MAC layer in the protocol stack for SIM1 is designed to transmit acknowledgements (ACK/NACK noted above) to sub-frames received by SIM1. NACKs, as well as absence of an acknowledgement for a sub-frame, causes the sender base station 110 to retransmit the corresponding sub-frame.

The HARQ acknowledgements by the respective MAC layers is achieved in the form of processing block 310 operating the shared transmit chain to schedule and transmit the respective acknowledgements. Alternatively, dedicated hardware may be contained in the transmit chain for transmitting the HARQ response, with processing block 310 merely scheduling the dedicated hardware for transmitting the respective HARQ responses.

RLC 430 performs operations such as error correction through ARQ, concatenation, segmentation and reassembly of RLC SDUs, re-segmentation of RLC data PDUs, duplicate detection, etc. When packets are deemed to be lost at the PHY/MAC level, RLC 430 (and the RLC layer for SIM1) may operate to recover the packet using the ARQ mechanism. PDCP 440 performs operations such as header compression and decompression, ciphering and deciphering, etc.

Layer 3 includes RRC (Radio Resource Control layer) 450 and NAS (Non-access Stratum protocol) 460. RRC 450 performs operations such as paging, establishment, maintenance and release of an RRC connection between UE 120 and the corresponding base station, security functions including key management, QoS (Quality of Service) management functions, measurement reporting and control of the reporting, etc. NAS 460 performs operations such as support of mobility of UE 120, support of session management procedures to establish and maintain IP connectivity between UE 120 and a packet data network gateway, etc.

Application layer 470 represents a communications component that allows software applications executing in UE 120 to communicate with software applications in other nodes (servers, etc.) via the other blocks shown in FIG. 4.

The description is continued with examples illustrating the manner in which acknowledgements to received sub-frames in a multi-SIM user equipment are scheduled using a shared transmit chain when receiving data continuously on each SIM.

5. Illustrative Examples

In an aspect of the present disclosure implemented in the context of LTE FDD, UE 120 receives data continuously and concurrently, on both SIM1 and SIM2, and uses a shared transmit chain for transmitting HARQ acknowledgments to the received data. Data from a base station is transmitted to UE 120 in units referred to as sub-frames, each sub-frame being 1 milli-second (ms) long, and termed a TTI (Transmission Time Interval). Data frames (or acknowledgements) from UE 120 are also transmitted in units of 1 ms sub-frames.

In LTE FDD, there are typically eight processes (software execution entities) in each of the uplink (UE 120 to base station) and downlink (base station to UE 120) directions. A process in the base station sends data in a sub-frame to UE 120, and goes into inactive state till an ACK or NACK is received from the UE. In response to receipt of the data sent at sub-frame 'n', the UE is expected to transmit an ACK/NACK (HARQ acknowledgement) to the packet at $(n+4)^{th}$ sub-frame. Depending on whether ACK or NACK is received, the base station either transmits a next packet (in case of ACK) or re-transmits the earlier packet (in case of NACK or no response at all (i.e., neither ACK nor NACK)) at $(n+8)^{th}$ sub-frame. Though described in terms of number of processes, it will be evident to one skilled in the relevant arts that the number 8 of the illustrative example represents a window/buffer size in terms of a maximum number of sub-frames which can be unacknowledged after having been transmitted, at any moment.

Assuming there are eight processes on the base station (as in LTE), each process waits for 8 ms before sending a next sub-frame (or a re-transmission of the previous unacknowledged data) over the wireless medium. Each process maintains a corresponding transmit buffer. A process maintains transmitted data in the corresponding transmit buffer till an ACK is received or a pre-determined number of retransmissions is crossed. Receipt of a NACK causes the process to retransmit the data in a corresponding sub-frame. New data is sent by a process once its transmit buffer is empty.

Similarly, UE 120 may also implement 8 processes (per SIM) in the uplink direction. Each process (of the 8 processes) at UE 120 also waits for 8 ms before transmitting a next acknowledgment, or retransmitting the same acknowledgment in the event the acknowledgment could not be or was not sent. Each of the eight processes (per SIM) at UE 120 maintains a corresponding transmit buffer. A process retains an acknowledgement in its transmit buffer until the acknowledgment is transmitted.

If a process could not transmit an acknowledgement in a scheduled sub-frame (referred to herein as a transmission opportunity), the process 're-transmits' the acknowledgment in the sub-frame occurring 8 ms later (the next transmission opportunity) according to LTE specification. The maximum number of transmission opportunities for a process is pre-determined, and communicated by the base station to UE 120 via an RRC Connection Reconfiguration message. The MAC layers in the respective protocol stacks corresponding to SIM1 and SIM2 manage the HARQ processes for each SIM.

It should be appreciated that the acknowledgements can be in the form of stand-alone sub-frames, though they can be piggy-backed on uplink data transmitted in the same sub-frame. Accordingly the description below is provided with respect to transmission of acknowledgments only. In an aspect, UE 120 alternately allocates the transmit chain for transmitting acknowledgements to data received for SIM1 and SIM2, with each allocation duration being termed a transmission window size (TWS).

Figure 5:
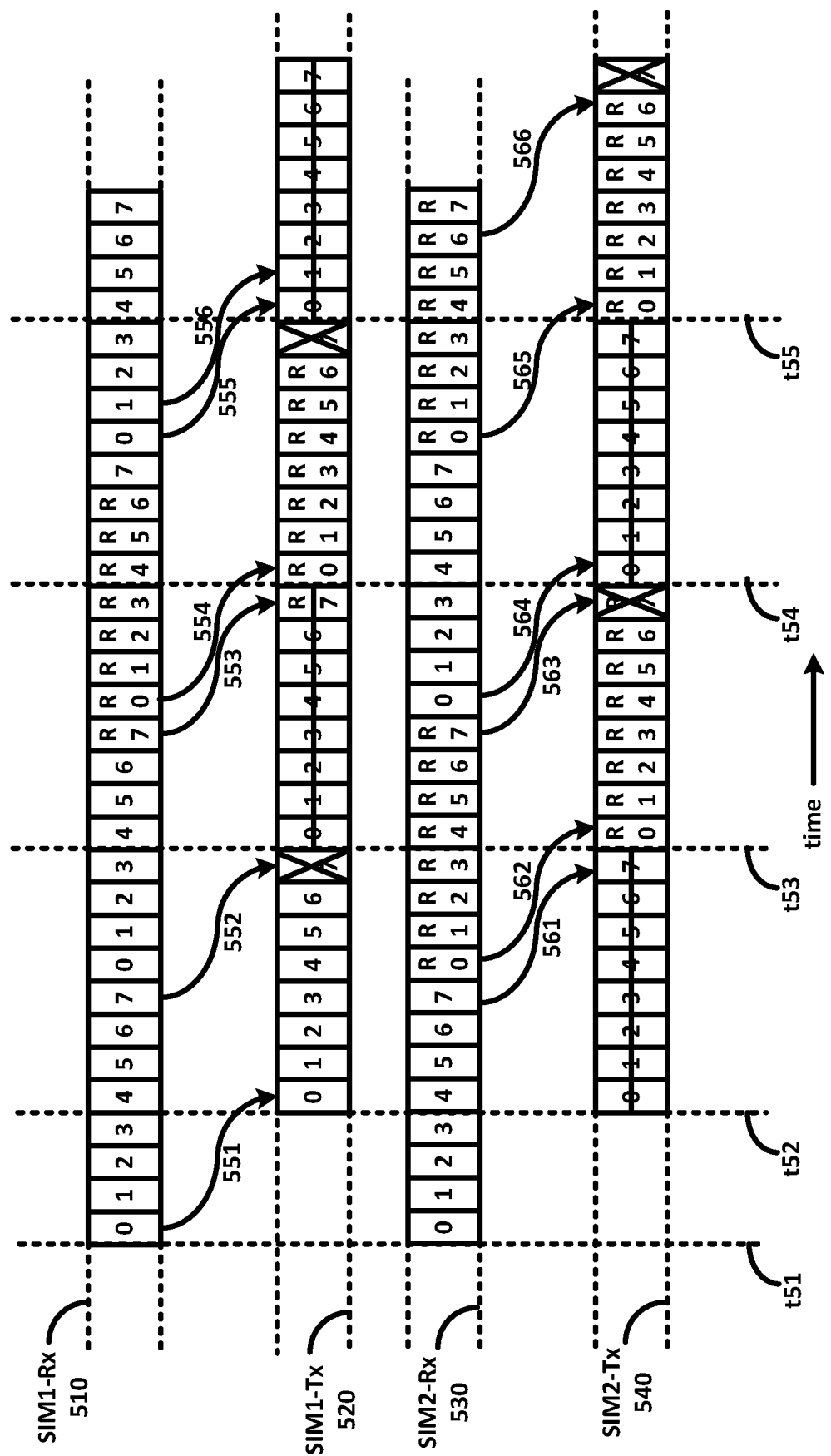
FIG. 5 is an example timing diagram illustrating an example scenario of a UE multiplexing a shared transmit chain for transmitting acknowledgments to receipt of multiple concurrent and continuous sequences of sub-frames, in an aspect of the present disclosure.

FIG. 5 is an example timing diagram showing the receipt of sub-frames by SIM1 and SIM2, and the corresponding HARQ responses transmitted by the shared transmit chain, when maxHARQ-Tx has a value of 2, and TWS is 8 ms. The parameter maxHARQ-Tx is the maximum number of transmissions of a same data (or acknowledgement) permitted by UE 120 in the uplink before transmission of that data (or acknowledgement) is deemed to have failed. Illustration for another set of values of TWS and maxHARQ-Tx, as well as the calculation for obtaining TWS from maxHARQ-Tx is provided in sections below.

In FIG. 5, timing sequence SIM1-Rx (510) represents a sequence of successive sub-frames received for SIM1 (360A), while timing sequence SIM2-Rx (530) represents a sequence of sub-frames received concurrently for SIM2 (360B). The sub-frames on SIM1-Rx 510 are received in successive intervals (i.e., continuously) because there is no sub-interval in which a sub-frame is absent. Thus, if a sub-frame were to be absent in one of the sub-intervals, the 'successive sub-frames' condition would not be met and the sub-frames are not received continuously.

Timing sequences SIM1-Tx (520) and SIM2-Tx (540) respectively represent transmissions of corresponding acknowledgments to the downlink data received by SIM1 and SIM2 respectively. In FIG. 5, transmissions (or scheduled transmissions which are not yet sent) are denoted by numbers (0, 1, 2, etc.) while retransmissions (or delayed transmissions) are denoted by numbers with an R prefix (R0, R1, etc.). Each box (e.g., 0, 1, R0, R7, etc.) in a timing sequence represents a TTI and is 1 ms long. Intervals t52-t53, t53-t54 and t54-t55 are each 8 ms long, and represent corresponding TWS. It is assumed that 1 ms of time is lost in switching the shared transmit chain for use by one SIM to the other. Further, it is assumed that a sub-frame when received is received without errors, and thus only corresponding ACKs are always noted as being transmitted.

In FIG. 5, SIM1 is shown as receiving four sub-frames (denoted 0, 1, 2 and 3) in time interval t51-t52, and SIM2 is also shown as receiving four sub-frames (denoted 0, 1, 2 and 3). The four sub-frames each represent respective sequences of frames received concurrently by SIM1 and SIM2 (step 210). Since both the sequences are continuous and concurrent (step 220 evaluates true), UE 120 allocates a sequence of eight successive sub-frames in interval t52-t53 to SIM1 for transmission of acknowledgements (step 230), and a next sequence of eight successive sub-frames in interval t53-t54 to SIM2 for transmission of acknowledgements (step 250).

Thus, the shared transmit chain of UE 120 transmits seven acknowledgements (denoted as 0, 1, 2, 3, 4, 5, and 6) to respective ones of received sub-frames 0, 1, 2, 3, 4, 5 and 6, each acknowledgement being 4 ms later than the corresponding receipt of data. Thus, arrow 551 shows the acknowledgement to received sub-frame 0. However, since 1 ms is lost in switching the transmit chain for use by SIM2 (starting from t53), UE 120 cannot transmit the acknowledgment 7 (marked with a cross to indicate it was not transmitted) corresponding to received sub-frame 7 (as indicated by arrow 552). Since in interval t52-t53, the transmit chain is allocated to SIM1, SIM 2 cannot use the transmit chain for transmitting acknowledgements to received data 0, 1, 2, 3, 4, 5, 6 and 7, and these slots are marked with 'strike out' in timing sequence 540 to indicate they could not be transmitted. Since the base station does not receive any acknowledgement for the transmitted data 0-7 for SIM2, the base station retransmits these sub-frames (denoted as R0-R7).

UE 120 allocates the shared transmit chain to SIM2 in interval t53-t54. Thus, starting at t53, the transmit chain transmits delayed acknowledgements R0 through R6 for the received re-transmitted data R0 through R6. Arrow 561 indicates that acknowledgement 7 is to be sent for received sub-frame 7. However, since 1 ms is lost in switching the transmit chain for use by SIM2 (starting from t53), UE 120 cannot transmit the acknowledgment 7 (marked with a cross to indicate it was not transmitted). In interval t53-t54, the shared transmit chain of UE 120 transmits seven acknowledgements (denoted as R0, R1, R2, R3, R4, R5, and R6) to respective ones of received re-transmitted sub-frames R0, R1, R2, R3, R4, R5 and R6, each acknowledgement being 4 ms later than the corresponding receipt of data.

However, since 1 ms is lost in switching the transmit chain for use by SIM1 (starting from t54), UE 120 cannot transmit the acknowledgment R7 (marked with a cross to indicate it was not transmitted) corresponding to received re-transmitted sub-frame R7 (as indicated by arrow 553).

Since in interval t53-t54, the transmit chain is allocated to SIM2, SIM1 cannot use the transmit chain for transmitting acknowledgements to received data 0, 1, 2, 3, 4, 5, 6 and R7, and these slots are marked with 'strike out' to indicate they could not be transmitted. In particular, since the base station has transmitted sub-frame 7 twice, and since no acknowledgement was received from UE 120 (arrows 552 and 553 indicate no ACK was sent), sub-frame 7 is lost (i.e., is not retransmitted further by the corresponding process at the base stations. Sub-frame 7 can be recovered by RLC layer of SIM1 using ARQ.

Similarly, since no acknowledgement was received from UE 120 for sub-frame 7 and retransmitted sub-frame R7 for SIM2, (arrows 561 and 563 indicate no ACK was sent), sub-frame 7 of SIM 2 is also lost, but can possibly be recovered by RLC layer of SIM2.

UE 120 checks again at t54 whether continuous (successive) sub-frames for SIM1 and SIM2 have been received concurrently immediately prior to (current time) t54. Since such a check evaluates true, UE 120 allocates the shared transmit chain to SIM1 in interval t54-t55, and the subsequent interval (end of this interval not shown in FIG. 5) to SIM2. Arrow 554 indicates acknowledgement R0 for received re-transmitted sub-frame R0. Arrow 555 indicates that acknowledgement 7 is to be sent for received original sub-frame 7. However, since 1 ms is lost in switching the transmit chain for use by SIM2 (starting from t55), UE 120 cannot transmit the acknowledgment 7 (marked with a cross to indicate it is not transmitted).

In interval t54-t55, the shared transmit chain of UE 120 transmits seven acknowledgements (denoted as R0, R1, R2, R3, R4, R5, and R6) to respective ones of received re-transmitted sub-frames R0, R1, R2, R3, R4, R5 and R6, each acknowledgement being 4 ms later than the corresponding receipt of data. Since in interval t54-t55, the transmit chain is allocated to SIM1, SIM 2 cannot use the transmit chain for transmitting acknowledgements to received data 0, 1, 2, 3, 4, 5, 6 and 7, and these slots are marked with 'strike out' to indicate they could not be transmitted.

UE 120 allocates the shared transmit chain to SIM2 for 8 ms interval starting at t55. Arrows 565 and 566 respectively indicate that acknowledgements R0 and R6 are transmitted in response to re-transmitted sub-frames R0 to R6 for SIM2. Sub-frame 7 is again lost. No acknowledgements are sent for SIM1 in the 8 ms duration starting at t55. UE 120 repeats the above allocations of the transmit chain in alternate 8 ms intervals to SIM1 and SIM2. One sub-frame out of 8 sub-frames is lost due to the multiplexing of the transmit chain.

Figure 6:
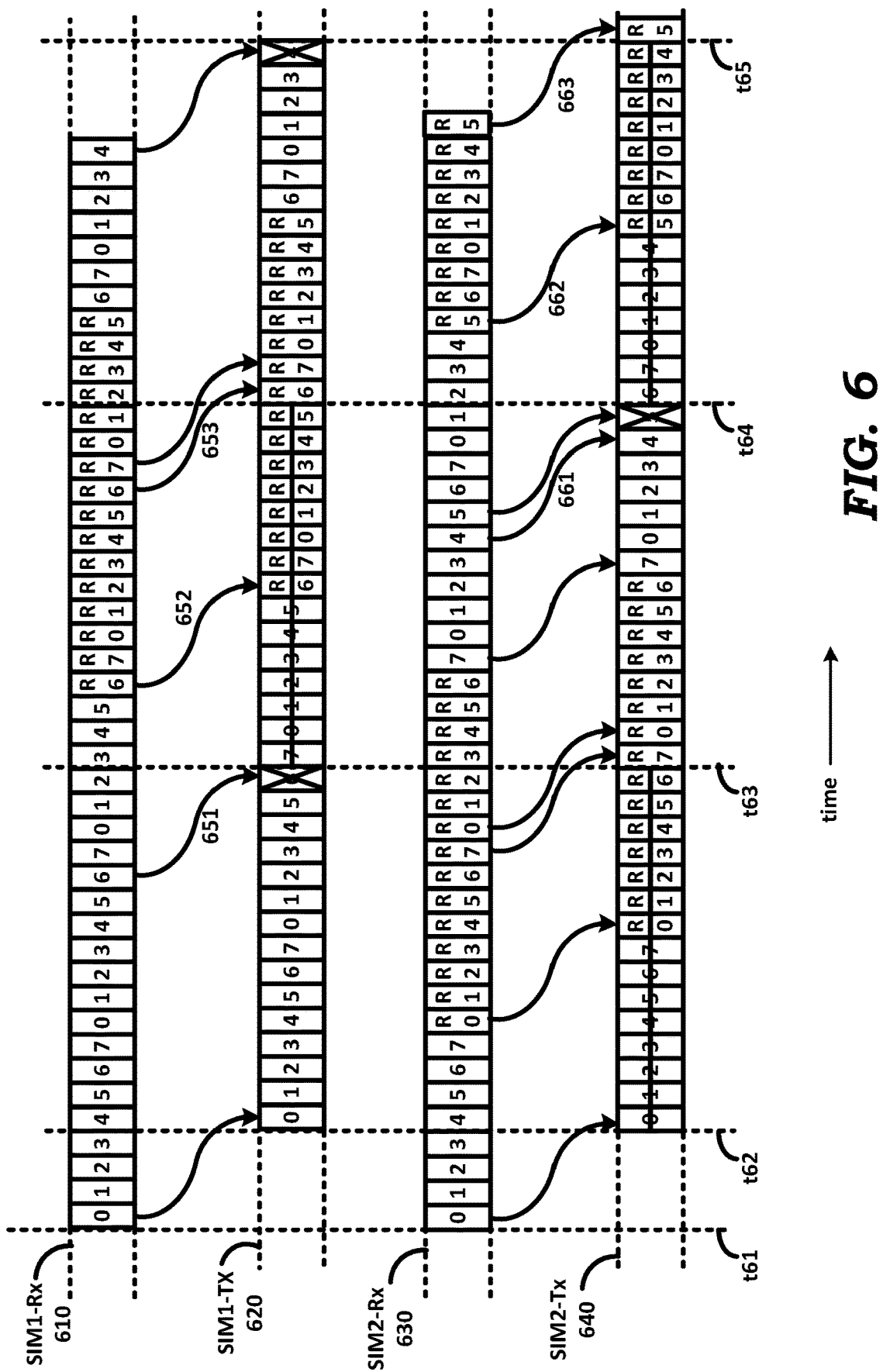
FIG. 6 is an example timing diagram illustrating another example scenario of a UE multiplexing a shared transmit chain for transmitting acknowledgments to receipt of multiple concurrent and continuous sequences of sub-frames, in an aspect of the present disclosure.

FIG. 6 is an example timing diagram showing the receipt of sub-frames by SIM1 and SIM2, and the corresponding HARQ responses transmitted by the shared transmit chain, when maxHARQ-Tx has a value of 3, and TWS is 15 ms. Again, it is assumed that transmissions (or scheduled transmissions which could not be sent) are denoted by numbers (0, 1, 2, etc.) while re-transmissions (or delayed transmissions) are denoted by numbers with an R prefix (R0, R1, etc.). Each box (e.g., 0, 1, R0, R7, etc.) in a timing sequence represents a TTI and is 1 ms long. Intervals t62-t63, t63-t64 and t64-t65 are each 15 ms long, and represent corresponding TWS. It is assumed that 1 ms of time is lost in switching the shared transmit chain for use by one SIM to the other. It is assumed that a sub-frame when received is received without errors, and thus only corresponding ACKs are always noted as being transmitted.

UE 120 is shown as allocating the transmit chain in time intervals t62-t63, t63-t64 and t4-t65 alternately for transmitting acknowledgements to sub-frames received by SIM1, SIM2 and SIM1. The operation of the transmit chain is similar to the description provided with respect to FIG. 5, except for the difference in TWS and maxHARQ-Tx, and is not provided here in the interest of brevity. However, it may be observed that no sub-frames (or data in general) is lost by either SIM1 or SIM2, since each received sub-frame is acknowledged within 3 transmit opportunities. In timing sequence 620, sub-frame 6 which could not be acknowledged (due to switching time incurred in switching the transmission chain to SIM2 at t63) in the first and second transmission opportunities (as indicated by arrows 651 and 652 respectively) is acknowledged at the third transmission opportunity (indicated by arrow 653). Similarly, in timing sequence 640, sub-frame 5 which could not be acknowledged (due to switching time incurred in switching the transmission chain to SIM1 at t64) in the first and second transmission opportunities (as indicated by arrows 661 and 662 respectively) is acknowledged at the third transmission opportunity (indicated by arrow 663)

With respect to FIG. 5 and FIG. 6, it is noted that if the concurrently received sub-frames are not continuous (step 220 of FIG. 2 evaluates false), then UE 120 may allocate respective sub-frame intervals to the two SIMS for transmitting the acknowledgments using the shares transmit chain using some other approach (step 260) which does not require the allocated sub-frame intervals to be successive. For example, if only a sparse number of sub-frames are received for each SIM, then UE 120 may multiplex the shared transmit chain to ensure that an acknowledgement to each sub-frame is always sent the first transmission opportunity, i.e., 4 sub-frames later (rather than missing some transmission opportunities as in the examples of FIG. 5 and FIG. 6).

Based on simulations, and also on the fact that base stations (such as base station 110) and UE 120 each use 8 HARQ processes, it has been observed that TWS values which are equal to, or very nearly equal to (shown as 1 less than the multiple), multiples of 8 of the maxHARQ-Tx values may provide satisfactory performance in terms of throughput loss when multiplexing a shared transmit chain to transmit acknowledgements. In an aspect, UE 120 uses 8 ms, 15 ms, 23 ms, 31 ms, 39 ms, 63 ms, 71 ms, 79 ms and 87 ms as possible values for TWS. TWS values of 47 ms and 55 ms are not used since with these values of TWS there is a substantial likelihood of one SIM losing synchronization with its downlink data by not being able to send 60 acknowledgements in 150 ms (required by the LTE standard, as also noted below). UE 120 maintains a table (700 of FIG. 7) containing percentage loss of data (i.e., percentage loss in throughput) in the downlink direction for the above-noted values of TWS for various values of maxHARQ-Tx (or retransmission limit, in general), as shown in FIG. 7.

In FIG. 7, row R1 lists the above-noted values of TWS (in ms), while column C1 lists example values of maxHARQ-Tx. The intersection of each of the other columns and rows lists the corresponding value of throughput loss for the corresponding value of TWS and maxHARQ-Tx. As an example, the intersection of R2 and C2 lists the throughput loss for a maxHARQ-Tx of 2 and TWS of 8 ms. When the SIM1 and SIM2 are associated with different maxHARQ-Tx values for transmission in the uplink, then TWS value calculated based on the lesser of the two maxHARQ-TX values, i.e., based on MIN (maxHARQ-Tx$_{SIM1}$, maxHARQ-Tx$_{SIM2}$), wherein MIN is the 'minimum' operator, maxHARQ-Tx$_{SIM1}$ is the maxHARQ-Tx value associated with SIM1, maxHARQ-Tx$_{SIM2}$ is the maxHARQ-Tx value associated with SIM2, with the specific manner in which TWS is calculated being as described herein.

The throughput loss values of the table of FIG. 7 are obtained in the following manner.

For values of a variable HARQretransmissiontime that are equal to TWS, and for values of TWS not equal to 8 ms, the throughput loss can be calculated as:

$$\text{Throughput loss}=\text{ceil}[(0.5)*100]/\text{TWS} \qquad \text{Equation 1}$$

wherein, ceil ( ) represents an operation defined as ceiling (x)=smallest integer greater than or equal to x, and wherein HARQretransmissiontime=(([maxHARQ-Tx)−1]*8).

For values of HARQretransmissiontime that are less than TWS, and if TWS equals 8 ms, the throughput loss can be calculated as:

$$\text{Throughput loss}=(\text{floor}((TWS+1)/(\text{maxHARQ-}Tx*8))*8)*100/TWS \qquad \text{Equation 2}$$

wherein floor ( ) represents an operation defined as floor(x)=largest integer less than or equal to x.

For example, for TWS=15 ms, and maxHARQ-Tx=2, throughput loss can be calculated as [{floor((15+1)/(2*8))*8}*100]/15, which evaluates to 53.33%, as indicated in table of FIG. 7. For TWS=23 ms, and maxHARQ-Tx=2, throughput loss can be calculated as [{floor((23+1)/(2*8))*8}*100]/23, which equals 34.78%, as indicated in table of FIG. 7.

For values of HARQretransmissiontime that are greater than TWS, there is no throughput loss. Although throughput loss values for only a limited set of combinations of TWS and maxHARQ-Tx values are shown in table 700, throughput loss values for other combinations of TWS and maxHARQ-Tx can be computed using the formulas provided above.

For a given value of maxHARQ-Tx (which is specified by base station 110), UE 120 selects the highest value of TWS corresponding to the given value of maxHARQ-Tx that has minimum throughput loss. As an example, with reference to table 700, if maxHARQ-Tx is 2, then TWS of 8 is selected. On the other hand, if maxHARQ-Tx is 5, then TWS of 31 is selected.

It is noted here that although the above description is provided in the context of transmission of acknowledgments, the same or similar techniques (with corresponding appropriate modifications) can be used when UE 120 transmits continuous sequences of uplink data concurrently for SIM1 and SIM2 using a shared transmit chain as well.

Thus, UE 120 minimizes throughput loss (which might otherwise lead to loss of synchronization with downlink data on one or both SIMs) and delays in downlink data, while multiplexing a shared transmitter to transmit acknowledgments to received sub-frames, as described in detail above. It is noted here that as per Specification 36.133, section 8.1.2.2.3, of 3GPP (3$^{rd}$ Generation Partnership Project), a UE is expected to transmit at least 60 acknowledgements (ACKs or NACKs) in a duration of 150 ms, provided there is continuous downlink data. The techniques described above enable UE 120 to comply with the above-noted constraint even while using a shared transmit chain. If the value of maxHARQ-Tx were to be changed by the base station, then UE 120 would again determine the optimum value of TWS to be used based on table 700, and change the TWS duration accordingly.

6. Conclusion

References throughout this specification to "one aspect", "an aspect", or similar language means that a particular feature, structure, or characteristic described in connection with the aspect is included in at least one aspect of the present disclosure. Thus, appearances of the phrases "in one aspect", "in an aspect" and similar language throughout this specification may, but do not necessarily, all refer to the same aspect.

Thus, in example 1, a wireless device receives concurrently a first sequence of sub-frames on a first SIM and a second sequence of sub-frames on a second SIM. The wireless device checks whether both of the first sequence of sub-frames and the second sequence of sub-frames have been received in successive sub-frame intervals prior to a current interval. If both of the first sequence of sub-frames and the second sequence of sub-frames have been received in successive sub-frame intervals prior to the current interval, the wireless device allocates a first sequence of successive sub-frame intervals to the first SIM to transmit using the transmit chain, and allocates a second sequence of successive sub-frame intervals to the second SIM to transmit using the transmit chain, with the second sequence of successive sub-frame intervals following the first sequence of successive sub-frame intervals.

In example 2, the wireless device of example 1 optionally transmits a first sequence of acknowledgements using the first SIM in the first sequence of successive sub-frame intervals, with each of the first sequence of acknowledgements corresponding to a respective sub-frame of the first sequence of sub-frames. The wireless device may also transmit a second sequence of acknowledgements using the second SIM in the second sequence of successive sub-frame intervals, with each of the second sequence of acknowledgements corresponding to a respective sub-frame of the second sequence of sub-frames.

In example 3, the wireless device of example 1 or 2 checks again at a last sub-frame interval of the second sequence of successive sub-frame intervals with the last sub-frame interval as the current interval, and repeats the above noted allocating actions and the transmitting actions if both of the first sequence of sub-frames and the second sequence of sub-frames have been received in successive sub-frame intervals prior to the current interval.

In example 4, the wireless device of examples 1-3 may receive the first sequence of sub-frames and the second sequence of sub-frames from a base station, wherein the sub-frames in each of the first sequence of sub-frames and second sequence of sub-frames are transmitted by a respective one of a total of N1 processes operational in the base station, wherein each of the N1 processes, after transmitting a corresponding sub-frame, is designed to enter an inactive state till an acknowledgment to the corresponding sub-frame is received from the wireless device.

In example 5, the wireless device of examples 1-4 optionally receives from the base station a maximum number (N2) of transmit opportunities provided to each wireless device for acknowledging a respective sub-frame, wherein a duration of each of the first sequence of successive sub-frame intervals and the second sequence of sub-frame intervals is determined based on the lesser of the values of N2 corresponding to the first SIM and the second SIM.

The features of the above examples are also shown as implemented as respective methods, and also as a computer readable medium storing instructions which upon execution causes the above noted features to be operative.

While various aspects of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

We claim:

1. A wireless device comprising:
a transmit chain;
a first holder for housing a first subscriber identity module (SIM);
a second holder for housing a second SIM; and
one or more processors configured to:
receive concurrently or simultaneously a first sequence of sub-frames for the first SIM and a second sequence of sub-frames for the second SIM;
determine whether the first sequence of sub-frames and the second sequence of sub-frames are received in respective successive sub-frame intervals prior to a current interval;
if the first sequence of sub-frames and the second sequence of sub-frames are received in successive sub-frame intervals prior to the current interval:
allocate a first sequence of successive sub-frame intervals to the first SIM to transmit using the transmit chain;
allocate a second sequence of successive sub-frame intervals to the second SIM to transmit using the transmit chain;
transmit a first sequence of acknowledgements for the first SIM in the first sequence of successive sub-frame intervals, wherein each of the first sequence of acknowledgements corresponds to a respective sub-frame of the first sequence of sub-frames;
transmit a second sequence of acknowledgements for the second SIM in the second sequence of successive sub-frame intervals, wherein each of the second sequence of acknowledgements corresponds to a respective sub-frame of the second sequence of sub-frames; and
wherein the second sequence of acknowledgements are transmitted after the first sequence of acknowledgements.

2. The wireless device of claim 1,
wherein the determination is performed again at a last sub-frame interval of the second sequence of successive sub-frame intervals with the last sub-frame interval as the current interval,
wherein the allocation and the transmission are repeated if the sub-frames of each of the first sequence of sub-frames and the second sequence of sub-frames are received in successive sub-frame intervals prior to the current interval.

3. The wireless device of claim 2,
wherein the first sequence of sub-frames and the second sequence of sub-frames are received from a base station,
wherein the sub-frames in each of the first sequence of sub-frames and second sequence of sub-frames are transmitted by a respective one of a total of N1 number of processes operational in the base station,
wherein each of the N1 number of processes, after transmitting a corresponding sub-frame, is to enter an inactive state until an acknowledgment to the corresponding sub-frame is received from the wireless device.

4. The wireless device of claim 3,
wherein the one or more processors are further configured to determine a maximum number (N2) of transmit opportunities provided to a wireless device for acknowledging a respective sub-frame,
wherein a duration of each of the first sequence of successive sub-frame intervals and the second sequence of sub-frame intervals is determined based on the lesser of the values of maximum number of transmit opportunities N2 corresponding to the first SIM and the second SIM.

5. A method performed in a wireless device containing a first subscriber identity module (SIM) and a second SIM, the first SIM and the second SIM of the plurality of SIMs sharing a transmit chain in the wireless device, the method comprising:

receiving concurrently a first sequence of sub-frames for the first SIM and a second sequence of sub-frames for the second SIM;

determining whether the first sequence of sub-frames and the second sequence of sub-frames are received in respective successive sub-frame intervals prior to a current interval; and if the first sequence of sub-frames and the second sequence of sub-frames are received in successive sub-frame intervals prior to the current interval:

allocating a first sequence of successive sub-frame intervals to the first SIM to transmit using the transmit chain;

allocating a second sequence of successive sub-frame intervals to the second SIM to transmit using the transmit chain;

transmitting a first sequence of acknowledgements for the first SIM in the first sequence of successive sub-frame intervals, wherein each of the first sequence of acknowledgements corresponds to a respective sub-frame of the first sequence of sub-frames;

transmitting a second sequence of acknowledgements for the second SIM in the second sequence of successive sub-frame intervals, wherein each of the second sequence of acknowledgements corresponds to a respective sub-frame of the second sequence of sub-frames; and wherein the second sequence of acknowledgements are transmitted after the first sequence of acknowledgements.

6. The method of claim 5,
wherein the determining is performed again at a last sub-frame interval of the second sequence of successive sub-frame intervals with the last sub-frame interval as the current interval,
wherein the allocation and the transmission are repeated if the sub-frames of each of the first sequence of sub-frames and the second sequence of sub-frames are received in successive sub-frame intervals prior to the current interval.

7. The method of claim 6,
wherein the first sequence of sub-frames and the second sequence of sub-frames are received from a base station,
wherein the sub-frames in each of the first sequence of sub-frames and second sequence of sub-frames are transmitted by a respective one of a total of N1 number of processes operational in the base station,
wherein each of the N1 number of processes, after transmitting a corresponding sub-frame, is to enter an inactive state until an acknowledgment to the corresponding sub-frame is received from the wireless device.

8. The method of claim 7, further comprising:
determining a maximum number (N2) of transmit opportunities provided to a wireless device for acknowledging a respective sub-frame,
wherein a duration of each of the first sequence of successive sub-frame intervals and the second sequence of sub-frame intervals is determined based on the lesser of the values of maximum number of transmit opportunities N2 corresponding to the first SIM and the second SIM.

9. The method of claim 8,
wherein at least N3 number of sub-frame intervals are required to switch the transmit chain from one of the first SIM and the second SIM to the other.

10. The method of claim 9,
wherein a duration of each of the first sequence of successive sub-frame intervals and the second sequence of sub-frame intervals represents a transmission window size (TWS), the method further comprising:
pre-computing throughput loss values for each combination of a set of TWS values and a set of values of the maximum number N2; and
for a specified value of N2, selecting each of the first sequence of successive sub-frame intervals and the second sequence of sub-frame intervals to equal that value of TWS which is the greatest TWS value that results in zero throughput loss.

11. The method of claim 10,
wherein the wireless device is designed to operate according to LTE (Long Term Evolution) specifications for each of the first SIM and the second SIM, wherein the N1 equals 8 and the N3 equals 1 millisecond.

12. The method of claim 5,
if both of the first sequence of sub-frames and the second sequence of sub-frames have not been received in successive sub-frame intervals prior to the current interval, the acknowledgement for each of the first sequence of sub-frames and the second sequence of sub-frames is sought to be sent at a fourth number (N4) of sub-frames after receipt of the corresponding sub-frame consistently.

13. A non-transitory machine readable medium storing one or more sequences of instructions for operating a wireless device containing a plurality of subscriber identity modules (SIMs), each SIM having a corresponding receiver of a plurality of receivers, a first SIM and a second SIM of the plurality of SIMs sharing a transmit chain in the wireless device, wherein execution of the one or more instructions by one or more processors contained in the wireless device enables the wireless device to perform the actions of:

receiving concurrently a first sequence of sub-frames for the first SIM and a second sequence of sub-frames for the second SIM;

determining whether the first sequence of sub-frames and the second sequence of sub-frames are received in respective successive sub-frame intervals prior to a current interval; and if the first sequence of sub-frames and the second sequence of sub-frames are received in successive sub-frame intervals prior to the current interval:

allocating a first sequence of successive sub-frame intervals to the first SIM to transmit using the transmit chain;

allocating a second sequence of successive sub-frame intervals to the second SIM to transmit using the transmit chain;

transmitting a first sequence of acknowledgements using the first SIM in the first sequence of successive sub-frame intervals, wherein each of the first sequence of acknowledgements corresponds to a respective sub-frame of the first sequence of sub-frames;

transmitting a second sequence of acknowledgements using the second SIM in the second sequence of successive sub-frame intervals, wherein each of the second sequence of acknowledgements corresponds to a respective sub-frame of the second sequence of sub-frames; and wherein the second sequence of acknowledgements are transmitted after the first sequence of acknowledgements.

14. The non-transitory machine readable medium of claim 13, wherein the determining is performed again at a last sub-frame interval of the second sequence of successive sub-frame intervals with the last sub-frame interval as the current interval, wherein the allocation and the transmission are repeated if the sub-frames of each of the first sequence of sub-frames and the second sequence of sub-frames are received in successive sub-frame intervals prior to the current interval.

15. The non-transitory machine readable medium of claim 14, wherein the first sequence of sub-frames and the second sequence of sub-frames are received from a base station, wherein the sub-frames in each of the first sequence of sub-frames and second sequence of sub-frames are transmitted by a respective one of a total of N1 number of processes operational in the base station, wherein each of the N1 number of processes, after transmitting a corresponding sub-frame, is to enter an inactive state until an acknowledgment to the corresponding sub-frame is received from the wireless device.

16. The non-transitory machine readable medium of claim 15, wherein the base station specifies a maximum number (N2) of transmit opportunities provided to a wireless device for acknowledging a respective sub-frame, wherein a duration of each of the first sequence of successive sub-frame intervals and the second sequence of sub-frame intervals is determined based on the lesser of the values of N2 corresponding to the first SIM and the second SIM.

17. The non-transitory machine readable medium of claim 16, wherein at least N3 number of sub-frame intervals are required to switch the transmit chain from one of the first SIM and the second SIM to the other.

* * * * *